United States Patent [19]
Merkell et al.

[11] 3,854,363
[45] Dec. 17, 1974

[54] CHAIN SAW UNIT
[75] Inventors: **Karl Ake Bengt Merkell;
Jan-Christer Henric Ovesson
Carlsen,** both of Sandviken, Sweden
[73] Assignee: Sandvik Aktiebolag, Sandvik,
Sweden
[22] Filed: May 21, 1973
[21] Appl. No.: 362,248

[30] Foreign Application Priority Data
Mar. 31, 1969 Switzerland.................... 4482

Related U.S. Application Data
[63] Continuation of Ser. No. 23,807, March 30, 1970, abandoned.

[52] U.S. Cl.................... 83/834, 83/830, 75/126 C
[51] Int. Cl............................................ B27b 33/14
[58] Field of Search............ 83/834, 833, 832, 830; 75/126 C, 126 R

[56] References Cited
UNITED STATES PATENTS
3,155,495  11/1964  Nakamura........................ 75/126 C
3,528,088  9/1970  Seghezzi et al............... 75/126 C X
3,548,897  12/1970  Ekrud................... 83/834

FOREIGN PATENTS OR APPLICATIONS
671,494  10/1963  Canada.............................. 83/834

*Primary Examiner*—Donald R. Schran
*Attorney, Agent, or Firm*—Pierce, Scheffler & Parker

[57] ABSTRACT

In a chain saw unit, composed of a saw chain and saw chain bar, for a motor-driven wood-cutting chain saw, longer working life and other desirable results flow from forming one or both of its components from a low alloy steel having a carbon content of 0.55 – 0.75 wt. percent, and containing silicon and chromium in controlled small amounts. The alloy may contain, also, small amounts of one or more of the alloying metals, Mo; W; Mn; V; Al and Ni. After the component is formed it is hardened, -preferably, austempered.

7 Claims, 3 Drawing Figures

CHAIN SAW UNIT

This is a continuation of U.s. Pat. application Ser. No. 23,807 filed Mar. 30, 1970, now abandoned.

This invention relates in general to motor-driven chain saws such as are employed in the cutting of wood, and is concerned in particular with a chain saw unit consisting of a saw chain and a support therefor.

Saw chains consisting of cutter links as well as other links, and supports, or "saw bars," therefor are usually manufactured from carbon steel or low alloy steel. It has also been tried to manufacture cutter links from high alloy stainless steel. All these earlier used chain saw units have not been satisfactory in differing aspects. As an example, saw chain links made of carbon steel or low alloy steel — and particularly the cutter links, exposed to the greatest strains — have not shown the desired toughness thereby causing insufficient life as a result: at the same time the edge sharpness and the wear resistance have not fulfilled, customary demands. High alloy stainless steel links, on the other hand, have experienced difficulties in manufacture. Among other things, the bending of the links has involved certain problems, and the refiling or regrinding of them has been found to be very difficult. The cost of such a material has also contributed to the result that interest in such links has been small.

As another example, saw bars made of carbon, or low alloy, steel have shown great wear, and a tendency to fracture and crack, particularly on the edges of the guide plates.

As examples of the steels used in the manufacture of the above-mentioned known saw chain or saw bar materials may here be mentioned (a) a low alloy steel containing, in weight percentages: 0.75 percent carbon, 0.25 percent silicon, 0.4 percent manganese, 0.5 percent chromium, 0.75 percent nickel and the remainder essentially iron, and (b) specially for cutter links, a high alloy stainless steel containing: 0.30 percent carbon, 0.25 percent silicon, 0.30 percent manganese, 14 percent chromium, and the remainder essentially iron.

Because of the increased demands which are nowadays made on chain saw units of motor-driven chain saws, i.a., concerning toughness, sharpness permanency and wear-resistance, there is a desire to manufacture such units with essentially increased efficiency compared to what has been produced up to now.

The present invention has made it possible to manufacture saw chain units, consisting mainly of saw chain links and guide plates, without the drawbacks which the earlier known units have shown.

By means of the invention it has thus been made possible to manufacture saw bars and saw chain links, like cutter links formed by bending, with essentially improved toughness, sharpness permanency and wear resistance. The steel, which is of a low alloy type, is also characterized by very good working characteristics, being of great importance in the manufacture of saw bars and saw chains, for instance in the bending of the cutter links.

According to the invention the low alloy steel meant for the chain saw unit is characterized by the following composition in percentages by weight: 0.55–0.75 percent carbon, 0.7–1.7 percent silicon, 0–1.5 percent manganese, 0.3–0.7 percent chromium, one or both of molybdenum or tungsten, the molybdenum content plus half the content of tugsten being 0.1–0.5 percent, 0–0.25 percent vanadium, 0–0.20 percent aluminum, 0–0.3 percent nickel and the remainder iron and normally present impurities. In general, the carbon content should be at the most 0.70 percent and preferably not be below 0.60 percent. The silicon content is normally at the most 1.4 percent and preferably at the lowest 0.9 percent. Furthermore, chromium is usually present in the narrower limits 0.4–0.6 percent, molybdenum and/or tungsten, the sum of the molybdenum content and half the content of tungsten being within the limits 0.2–0.4 percent. Furthermore, the steel normally contains 0.05–0.20 percent vanadium and/or 0.02–0.20 percent aluminum. The manganese content is generally at the most 0.60 percent.

The steel has a carefully chosen composition for obtaining the best results when hardening the steel by austempering. The links of the saw chain are therefore generally austempered. It is also possible, however, to obtain good results by conventional hardening and tempering. The saw bar is often hardened by conventional technique.

The chain saw unit according to the invention is characterized by excellent workability, and exceptionally high toughness and very good permanency of sharpness and wear resistance, in spite of the lower carbon content of the alloy compared to the carbon steels and low alloy steels generally used for the purpose.

The remarkably good toughness of the chain saw unit according to the invention, compared to corresponding quality of conventionally made units, consisting of saw chains and guide plates, has been produced by a carefully adjusted carbon content of the steel alloy in combination with the alloying elements Si, Cr and Mo and/or W. By an addition of V and/or Al the steel is moreover given a great hardening field, i.e., hardening is made possible from a broader temperature interval without producing grain growth at the higher temperatures. Owing to this, the chain saw units according to the invention have less susceptibility to variations of hardening temperature and holding time, meaning i.a., reduced manufacturing difficulties and a more uniform product.

In the manufacturing of the chain saw units according to the invention, for instance cutter links formed by bending, the steel first is rolled to strip, from which strip guide plates and link blanks are formed and possibly bent (cutter links). After finishing of the links and plates, they are hardened. Preferably the hardening is done so that the links shall have bainitic structure (austempering). In the metallurgrical preparation of the steel it has been found suitable to let it undergo a vacuum degassing after or during the melting, which causes a very good freedom from slag. It may also be mentioned that the steel, before cold rolling to the desired band thickness, is generally subjected to a soft annealing, giving a spheroidizing of the carbide phase, and that in a normal way a number of recrystallization annealings are done during the cold rolling process.

The invention will now be described in greater detail and with reference to the accompanying drawing, in which.

Figure 1:
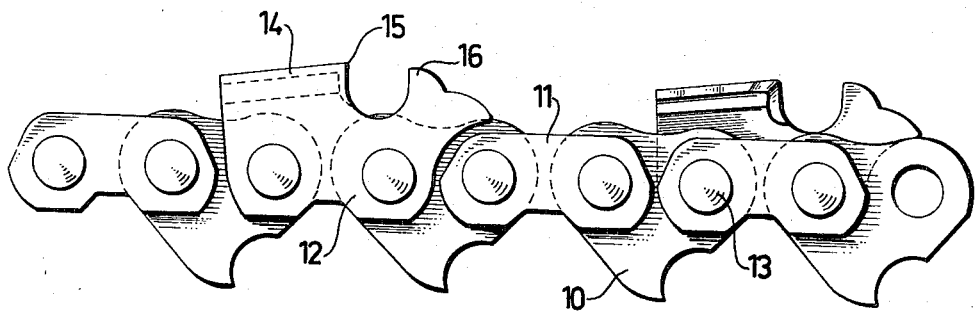
FIG. 1 shows an embodiment of a saw chain in a chain saw unit according to the invention.
Figure 2:
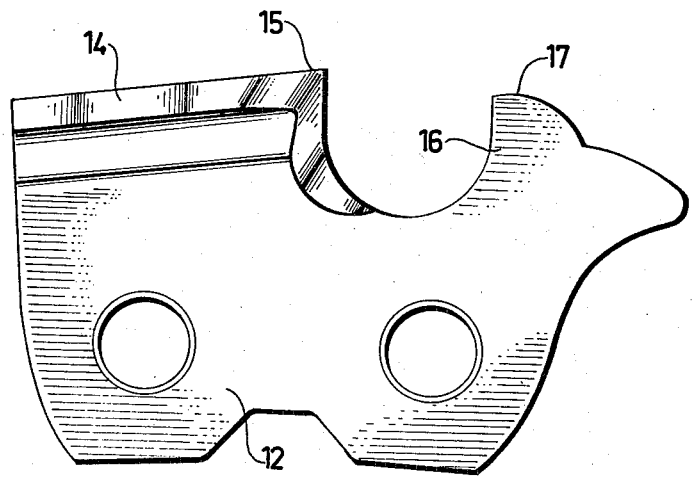
FIG. 2 shows in sectional view and in a greater scale a cutter link present in the saw chain unit according to FIG. 1.
Figure 3:
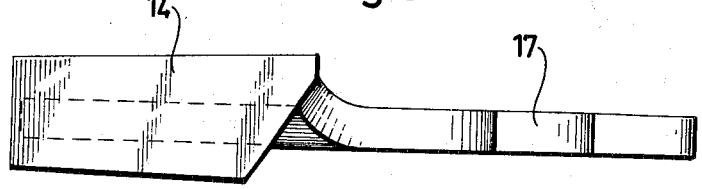
FIG. 3 is a top plan view of the same link.

The saw chain shown in FIG. 1 consists of center links 10, also called driving links, and side links 11 and 12 of which the last-mentioned links 12 are shaped as cutter links. The links are connected in an articulated way by means of rivets 13. The cutter links are furnished with a shovel-shaped cutting teeth part 14, which has a cutting edge at its front end in the movement direction. The cutter link also has at some distance from the cutting tooth part, a shoulder 16, the function of which is to determine the depth of the saw cut. The top 17 of the shoulder (see FIGS. 2 and 3) is placed somewhat below the edge of the cutting edge part. The shape of the cutter links 12 with the shovel-formed cutting tooth part is clearly observed in FIGS. 2 and 3. The saw chain and the support therefor make an assembly which is ready for attachement to a power source, such as a portable engine. Because the saw chain — or at least its cutter links — are made of the material according to the invention the chain enjoys an essentially longer life than what has been possible with saw chains of carbon steel and low alloy steel heretofore on the market. By reason of a very high sharpness permanency and wear resistance of the links the important advantage is obtained that the intervals between regrindings of the cutting tooth parts are essentially prolonged. By making the links, for instance the cutter links, of the normally austempered steel according to the invention, i.a., the toughness is increased most essentially, not least at the cutting edge. As examples of preferably used steel compositions, identified in percentages by weight, may here be mentioned:

1. 0.60–0.70 percent carbon, 1.0–1.4 percent silicon, 0.30–0.45 percent manganese, 0.4–0.6 percent chromium, 0.2–0.4 percent molybdenum, 0.1–0.2 percent vanadium, and the remainder iron with a normal small amount of impurities.

2. About 0.64 percent carbon, about 1.2 percent silicon, about 0.35 percent manganese, about 0.5 percent chromium, about 0.15 percent vanadium, max. 0.025 percent phosphorus, max. 0.015 percent sulphur and the remainder iron with an insignificant amount of impurities.

The steel in the links should (as has earlier been mentioned) be hardened by austempering, comprising heating in the temperature range 850°–950° C., for instance about 880° C., during a short time, e.g., 3–15 minutes, followed by cooling in a salt bath at a temperature within the interval 280°–330° C., e.g., 300° C.

The high silicon content of the steel has another benefit of great importance, to wit, the tendency of so-called friction hardening is reduced or prevented in the chain saw unit. Such undesirable hardening may occur in the parts of the chain saw and its support which are in frictional contact with each other during the sawing.

In manufacturing the saw bar, which often is made of the mentioned preferably used steel compositions, the following technique may be used:

After cold-rolling and hardening of the steel strip, the guide plates are punched or sheared. The two side plates are then connected with the center plate by spot welding. After treating to a temperature of about 550° C. and plaining, the edges of the side plates are hardened to a depth of about 2 mm (millimeters) by high-frequency heating.

It has been found that saw bars made from the low alloy steel according to the invention have a better toughness, wear-resistance and less tendency to cracking after high-frequency hardening than prior used saw bars.

We claim:

1. A saw chain link, in heat-treated and hardened condition, for a saw chain of a motor-driven chain saw, said link being made of a low alloy steel with good working qualities and at the same time having very high toughness, sharpness-permanency and wear-resistance, said low alloy steel being composed of, in weight percentages: 0.60–0.7 percent carbon, 0.9–1.4 percent silicon, 0–1.5 percent manganese, 0.3–0.7 percent chromium, one of the metals molybdenum and tungsten, 0.1–0.5 percent, 0–0.25 percent vanadium, 0–0.20 percent aluminum, 0–0.3 percent nickel and the remainder iron and normally present impurities, the microstructure of the link being bainitic, and which has been hardened by being heated at 850°–950° C. for 3–15 minutes and quenched in a salt bath at 280°–330° C.

2. Saw chain link as defined in claim 1, wherein said link is a saw chain cutter link.

3. Saw chain link as defined in claim 1, in which the chromium content is 0.4–0.7 percent, preferably 0.4–0.6 percent.

4. Saw chain link according to claim 1, in which the alloy contains 0.05–0.20 percent vanadium.

5. Saw chain link according to claim 1, in which the alloy contains 0.02–0.20 percent aluminum.

6. A saw chain link for a saw chain, of a motodriven chain saw, said link being made of a low alloy steel with good working qualities and at the same time having very high toughness, sharpness-permanency and wear-resistance, said low alloy steel being composed of, in weight percentages: 0.60–0.7 percent carbon, 0.9–1.4 percent silicon, 0–1.5 percent manganese, 0.3–0.7 percent chromium, one of the metals molybdenum and tungsten, 0.1–0.5 percent, 0–0.25 percent vanadium, 0–0.20 percent aluminum, 0 –0.3 percent nickel and the remainder iron and normally present impurities.

7. A saw chain link, in heat-treated and hardened condition, for a saw chain of a motor-driven chain saw, said link being made of a low alloy steel with good working qualities and at the same time having very high toughness, sharpness-permanency and wear-resistance, said low alloy steel being composed of, in weight percentages: 0.55–0.75 percent carbon, 0.7–1.7 percent silicon, 0–1.5 percent manganese, 0.3–0.7 percent chromium, one of the metals molybdenum and tungsten, 0.1–0.5 percent, 0–0.25 percent vanadium, 0–0.20 percent aluminum, 0–0.3 percent nickel, and the remainder iron and normally present impurities, the microstructure of the link being bainitic and which has been hardened by being heated at 850°–950° C. for 3–5 minutes and quenched in a salt bath at 280°–330° C.

* * * * *

UNITED STATES PATENT OFFICE
CERTIFICATE OF CORRECTION

Patent No. 3,854,363     Dated December 17, 1974

Inventor(s) KARL AKE BENGT MERKELL and JAN-CHRISTER HENRIC OVESSON CARLEN

It is certified that error appears in the above-identified patent and that said Letters Patent are hereby corrected as shown below:

Name of second inventor incorrectly spelled:

"Carlsen" should read   Carlen

Priority is incorrect:

SWITZERLAND should read :   SWEDEN

Signed and sealed this 1st day of April 1975.

(SEAL)
Attest:

RUTH C. MASON
Attesting Officer

C. MARSHALL DANN
Commissioner of Patents
and Trademarks